United States Patent [19]
Kim et al.

[11] Patent Number: 6,058,121
[45] Date of Patent: May 2, 2000

[54] FINE FFT WINDOW POSITION RECOVERY APPARATUS OF AN OFDM SYSTEM RECEIVER

[75] Inventors: Dong-kyu Kim, Pusan; Sang-hyun Do; Hyung-jin Choi, both of Seoul; Myeong-hwan Lee, Suwon, all of Rep. of Korea

[73] Assignee: Samsung Electronics Co., Ltd., Kyungki-do, Rep. of Korea

[21] Appl. No.: 09/005,043

[22] Filed: Jan. 9, 1998

[30] Foreign Application Priority Data

Jan. 10, 1997 [KR] Rep. of Korea .................. P97-535

[51] Int. Cl.[7] .............................. H04J 1/00; G01R 23/00
[52] U.S. Cl. ............................. 370/480; 708/404
[58] Field of Search ...................... 708/400, 403, 708/404; 375/224, 260, 340; 370/480

[56] References Cited

U.S. PATENT DOCUMENTS 5,301,123  4/1994  Kay ........................................ 364/485

*Primary Examiner*—Douglas W. Olms
*Assistant Examiner*—David R. Vincent
*Attorney, Agent, or Firm*—Sughrue, Mion, Zinn, Macpeak & Seas, PLLC

[57] ABSTRACT

A fine fast Fourier transform window position recovering apparatus of an OFDM system receiver for recovering the phase error of an FFT window by using the number of zero-crossings of the phase variation value calculated between transmitted and received complex values is provided. The fine FFT window position recovering apparatus includes: an analog to digital converter, a symbol start detector, an FFT means, a phase calculator, a zero-crossing counter and an FFT window controller. The apparatus makes it possible to guarantee the reliability of a system by adjusting the phase error of the FFT window by using the number of zero-crossings of the phase variation calculated between the transmitted and received complex values and the number of the zero-crossings of the amplitude of the real part or the imaginary part of the received complex value.

10 Claims, 8 Drawing Sheets

FINE FFT WINDOW POSITION RECOVERY APPARATUS OF AN OFDM SYSTEM RECEIVER

BACKGROUND OF THE INVENTION

1. Field of the Invention

The present invention relates to an orthogonal frequency division multiplexer (OFDM) system, and more particularly, to a fine fast Fourier transform (FFT) window position recovery apparatus of an OFDM system receiver.

2. Description of Related Art

In general, time synchronization should be performed accurately in order for a receiver to recover an OFDM signal transmitted in European digital broadcasts. Time synchronization includes FFT window position recovery, for a parallel process of a correct signal, and a sampling clock recovery, for controlling the sampling clock signal of an analog-to-digital converter (ADC), for sampling a portion in which the signal-to-noise ratio (SNR) is highest in a received signal.

Figure 1:
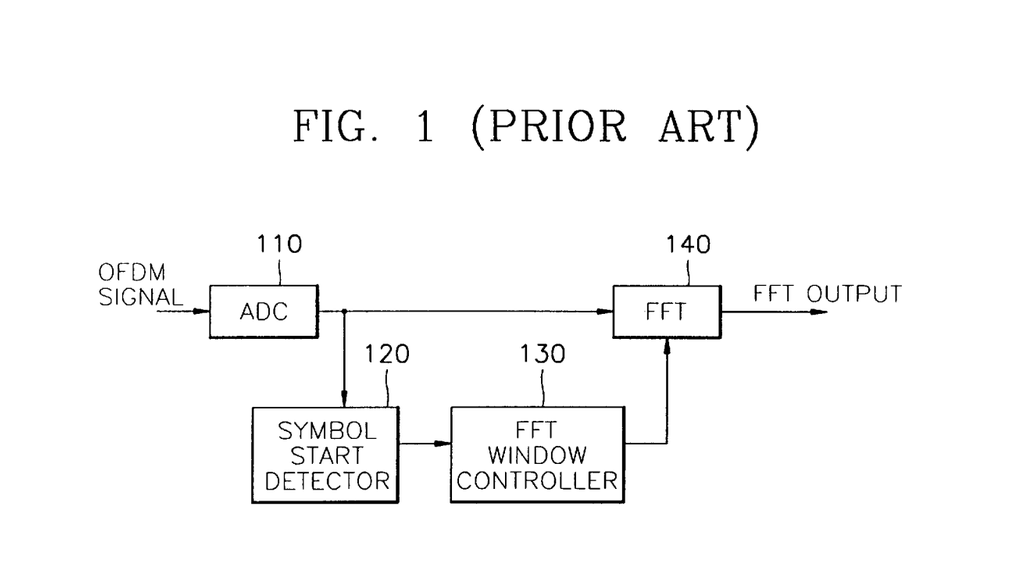
FIG. 1 is a block diagram of the structure of a conventional OFDM system receiving apparatus.

FIG. 1 is a block diagram showing the structure of a conventional OFDM system receiving apparatus, which includes an ADC 110 for converting a received OFDM analog signal into a digital signal, a symbol start detector 120 for detecting the start of a symbol from the samples output by ADC 110, an FFT window controller 130 for generating an FFT window control signal from a symbol start signal output by symbol start detector 120, and an FFT 140 for fast Fourier transforming the data generated in ADC 110 based on the FFT window control signal generated by FFT window controller 130.

An OFDM signal symbol includes a guard interval, having G sample lengths, interposed between symbols in order to prevent interference between N effective data samples, which are the outputs of an inverse fast Fourier transform (IFFT), and the symbols when there are N FFTs. Namely, a guard interval copies the rear portion of an effective data section. A transmitter (not shown) transmits a symbol, including (G+N) samples, obtained by adding N complex values to G complex values output from an IFFT (not shown).

[Equation 1]

$$S_j = \sum_{n=-G}^{N-1} x_{m,n} = \sum_{n=-G}^{-1}\sum_{k=0}^{N-1} X_{m,k} e^{j2\pi k(N+n)/N} + \sum_{n=0}^{N-1}\sum_{k=0}^{N-1} X_{m,k} e^{j2\pi kn/N}$$

Equation 1 represents the mth symbol formed of the complex value output from FFT 140. Here, m, k, N, and n represent a symbol number, a subcarrier number (index), the number of samples of the effective data and a sample time, respectively. In Equation 1, the first term, $$\sum_{n=-G}^{-1}\sum_{k=0}^{N-1} X_{m,k} e^{j2\pi k(N+n)/N},$$

represents a guard interval and the second term, $$\sum_{n=0}^{N-1}\sum_{k=0}^{N-1} X_{m,k} e^{j2\pi kn/N},$$

represents effective data.

As shown in FIG. 1, the received OFDM signal is converted into digital data by analog-digital converter (ADC) 110. In the sampled OFDM signal output from ADC 110, the start of a symbol is detected by symbol start detector 120 by detecting the position in which the cross-correlation value of a received signal is the highest. The second term is sequentially input to FFT 140 after the guard interval, which is the first term of Equation 1, is removed. An FFT window controller 130 designates the FFT window starting position for FFT 140 by using symbol start information from symbol start detector 120. Here, the first value output from a transmitting IFFT (not shown) must be input first to FFT 140. The Nth value output from the transmitting IFFT must be input Nth to FFT 140.

The first value output from the transmitting IFFT must be input to FFT 140 after searching for the start of a symbol in the receiver. Symbol start detector 120 detects the start of the symbol during an initial stage, as mentioned above. However, when the receiver is moving, symbol start detector 120 may not correctly estimate the start of a symbol due to receiver fading phenomena and the influence of its surroundings. Accordingly, the Nth value or the second value of the previous symbol is input first to FFT 140. Therefore, one value may be pushed or pulled and input to the FFT port. When the start of a symbol is not correctly estimated, the symbol cannot be correctly recovered. Accordingly, the performance of the system deteriorates.

SUMMARY OF THE INVENTION

It is an object of the present invention to provide an apparatus for recovering the phase error of a fast Fourier transform (FFT) window by using the number of zero-crossings of a calculated phase variation value between transmitted and received complex values in an OFDM system.

It is another object of the present invention to provide an apparatus for recovering the phase error of an FFT window by using the number of zero-crossings of the amplitude of the real or imaginary part of the received complex value in an OFDM system.

To achieve the first object, a fine FFT window position recovering apparatus of an OFDM receiver is provided that recovers a fast Fourier transform (FFT) window position by using a symbol, including N effective data samples and G guards intervals. The apparatus comprises:

- an analog-to-digital converter for converting an OFDM signal into a digital complex sample;
- a symbol start detector for detecting the starting portion of the symbol from the digital complex samples output from the analog-digital converter;
- an FFT means for fast Fourier transforming the digital complex sample generated from the analog-to-digital converter based on the symbol start portion detected by the symbol start detector;
- a phase calculator for calculating phase variations between the complex value output from the FFT means and the known transmitted complex value;
- a zero-crossing counter for counting the number of zero-crossings of the phase variations generated by the phase calculator; and an FFT window controller for activating the FFT of the FFT means, based on the symbol starting portion detected by the symbol start detector, and for compensating for the sample error of the FFT of the FFT means by detecting the remaining FFT position error of a sample unit from the number of zero-crossings generated by the zero-crossing counter.

To achieve the second object, a fine FFT window position recovering apparatus of an OFDM receiver is provided that recovers an FFT window position using a symbol, including N effective data samples and G guard intervals as a unit. The apparatus comprises:

an analog-to-digital converter for converting an OFDM signal into a digital complex sample;

a symbol start detector for detecting the starting portion of the symbol from the digital complex samples output by the analog-to-digital converter;

an FFT means for fast Fourier transforming the complex digital sample generated by the analog-digital converter based on the symbol start portion detected by the symbol start detector;

a zero-crossing counter for counting the number of zero-crossings of the complex signal amplitude output by the FFT means; and an FFT window controller for activating the FFT of the FFT means, based on the symbol starting portion detected from the symbol start detector, and for compensating for the sample error of the FFT of the FFT means by detecting the remaining FFT position error of a sample unit from the number of zero-crossings generated by the zero-crossing counter.

BRIEF DESCRIPTION OF THE DRAWINGS

The above objects and advantages of the present invention will become more apparent by describing in detail a preferred embodiment thereof, with reference to the drawings in which:

FIGS. 4a through 4d are graphs showing phase variations between transmitted and received complex signal values according to the error of a window position in the apparatus shown in FIG. 2;

FIGS. 5a through 5d are graphs showing changes in the real part of an FFT output value according to a window position error in the apparatus shown in FIG. 3; and FIGS. 6a through 6d are graphs showing changes in the imaginary part of an FFT output value according to a window position error in the apparatus shown in FIG. 3.

DETAILED DESCRIPTION OF THE PREFERRED EMBODIMENT

Figure 2:
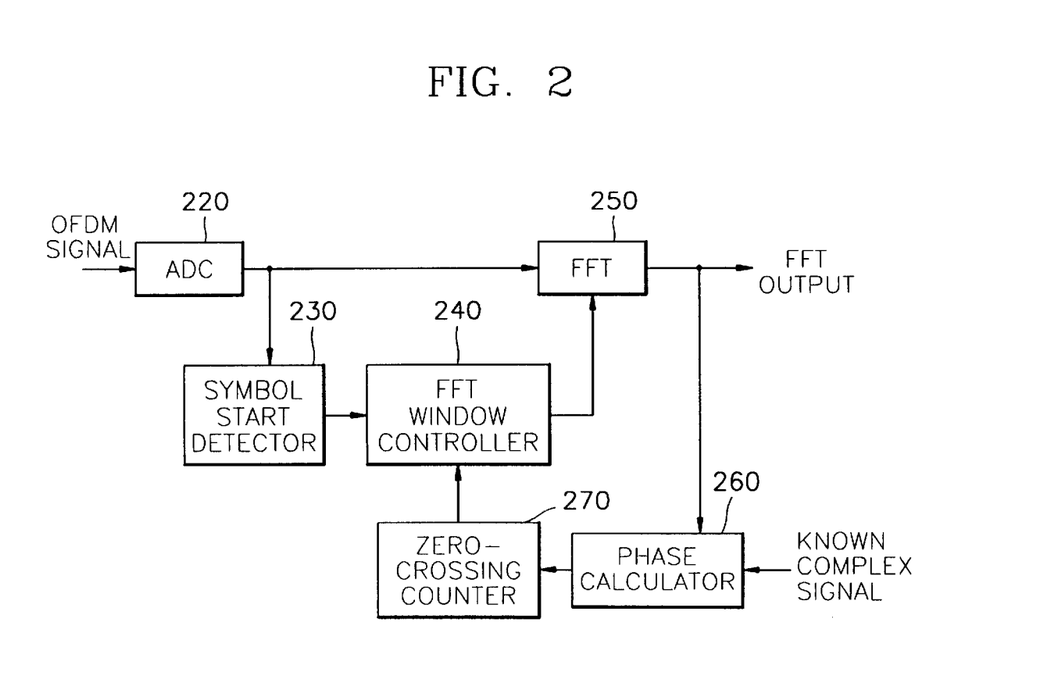
FIG. 2 is a block diagram of a first embodiment of a fine FFT window position recovering apparatus of an OFDM system receiver according to the present invention.

A preferred embodiment of the present invention will be described with reference to the drawings. The apparatus shown in FIG. 2 is a first embodiment of a fine FFT window position recovering apparatus of an OFDM system receiver according to the present invention. The apparatus includes:

an ADC 220 for converting a received OFDM signal into a digital complex sample;

a symbol start detector 230 for detecting the start of a symbol from the samples output from ADC 220;

an FFT 250 for fast Fourier transforming samples generated by ADC 220;

a phase calculator 260 for calculating a phase variation between the complex value output by FFT 250 and the value known to the transmitter and the receiver;

a zero-crossing counter 270 for counting the number of zero-crossings of the phase calculated by phase calculator 260; and an FFT window controller 240 for designating the FFT start position of FFT 250 based on the symbol start signal detected by symbol start detector 230 and the number of zero-crossings generated by zero-crossing counter 270.

Figure 3:
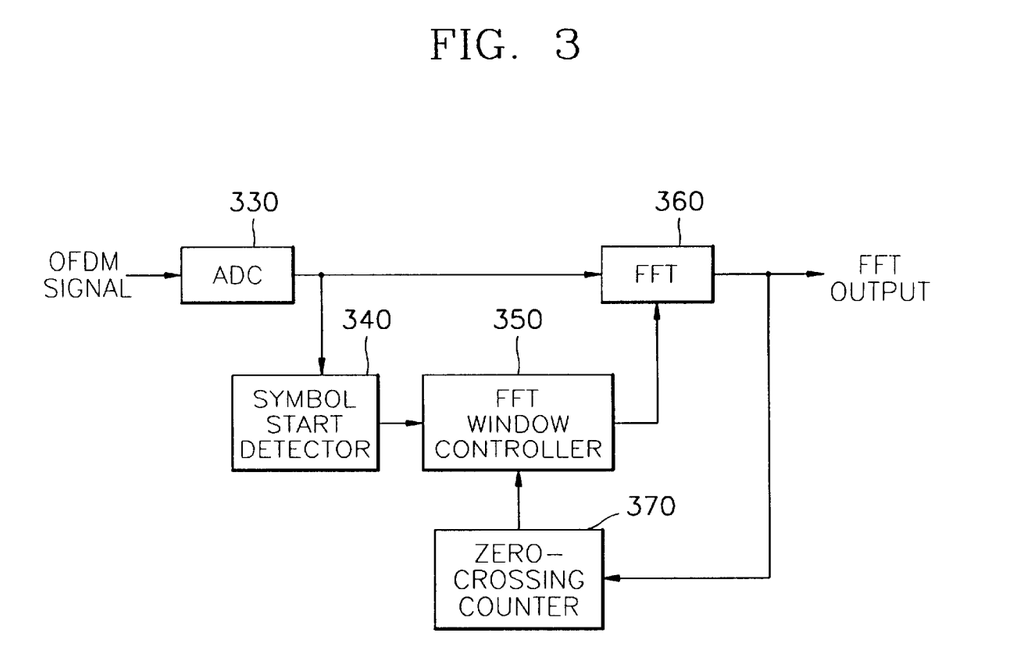
FIG. 3 is a block diagram of a second embodiment of a fine FFT window position recovering apparatus of an OFDM system receiver according to the present invention.

The apparatus shown in FIG. 3 is a second embodiment showing a fine FFT window position recovering apparatus of an OFDM system receiver according to the present invention. The apparatus includes:

an ADC 330 for converting a received OFDM signal into a complex digital sample;

a symbol start detector 340 for detecting the start of a symbol from the samples output from ADC 330;

an FFT 360 for fast Fourier transforming data generated by ADC 330 based on the symbol start signal detected by symbol start detector 340;

a zero-crossing counter 350 for counting the number of zero-crossings of the amplitude output by FFT 360; and an FFT window controller 360 for designating an FFT activating position area of FFT 360 based on the symbol start signal detected by symbol start detector 340 and the number of zero-crossings generated by zero-crossing counter 370.

Figure 4A:
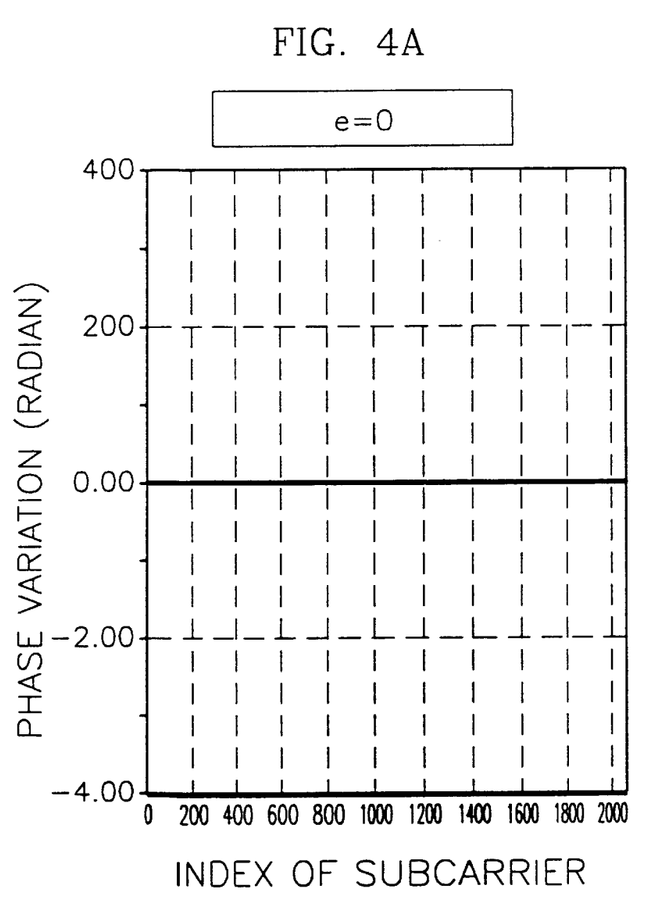
Figure 4B:
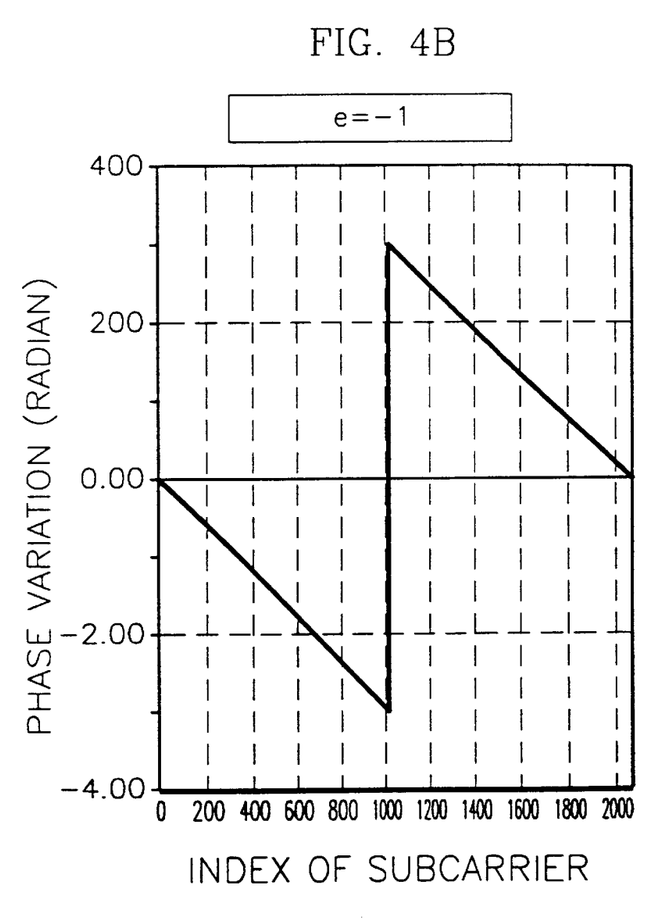
Figure 4C:
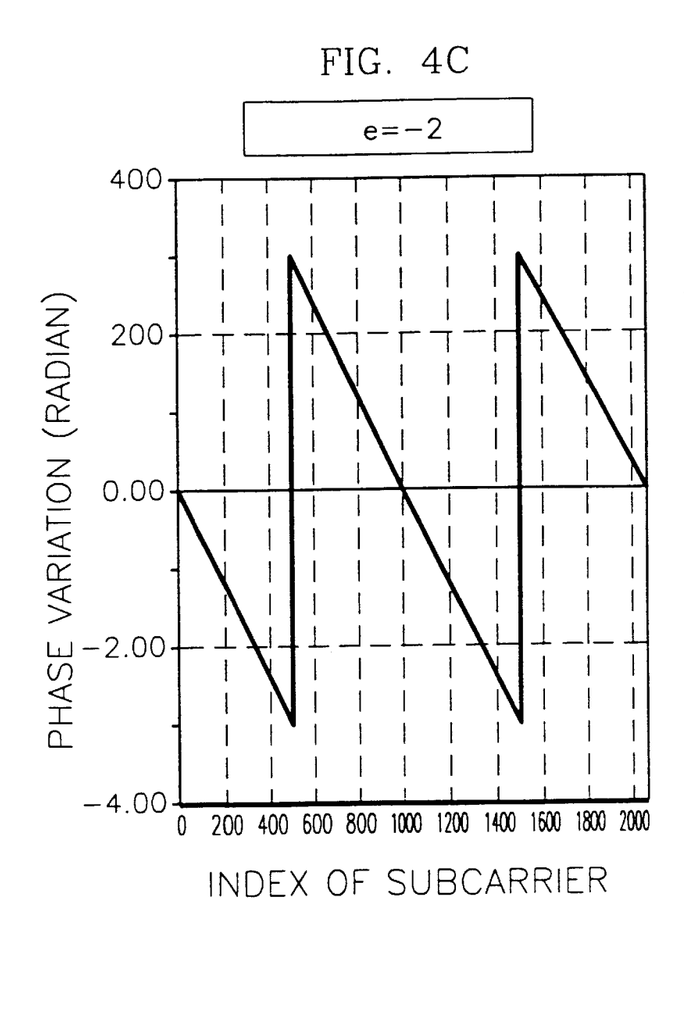
Figure 4D:
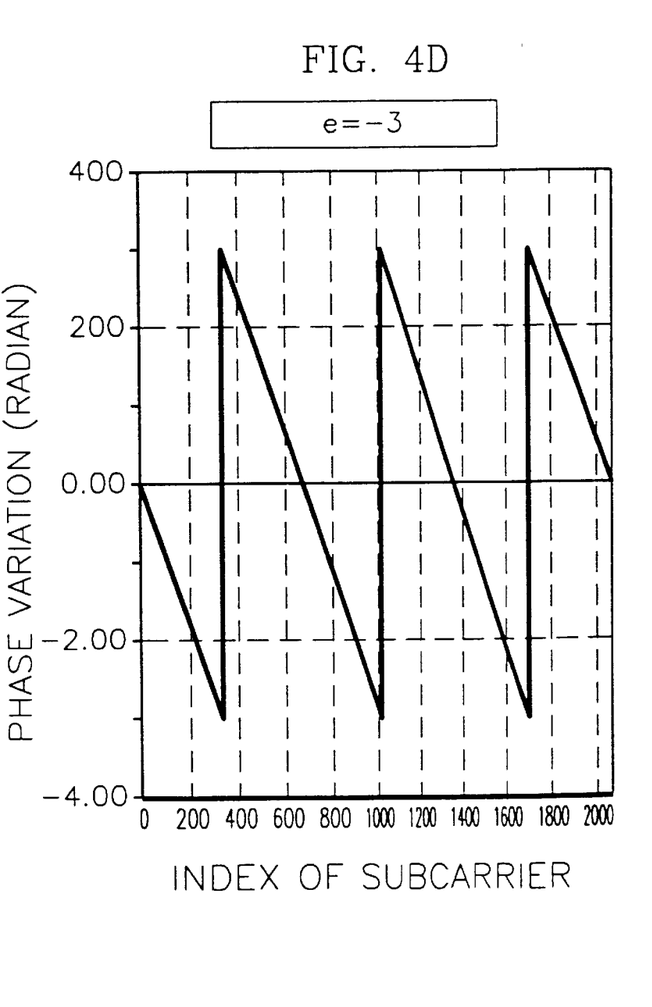

FIGS. 4a through 4d are graphs showing the phase variation between transmitted and received signal values based on a window position error (e=0, −1, −2, and −3) in phase calculator 260 of FIG. 2. When the subcarrier index numbers 0 through 2047 are sequentially detected, a sample position error does not exist, as shown by the graph of FIG. 4A, because a phase difference is not generated. FIGS. 4b through 4d are graphs showing states in which a phase difference is generated because an error (e=−1, −2, and −3) in a sample is generated. The x-axes represent the index of a subcarrier and the y-axes represent the magnitude of a phase variation.

Figure 5A:
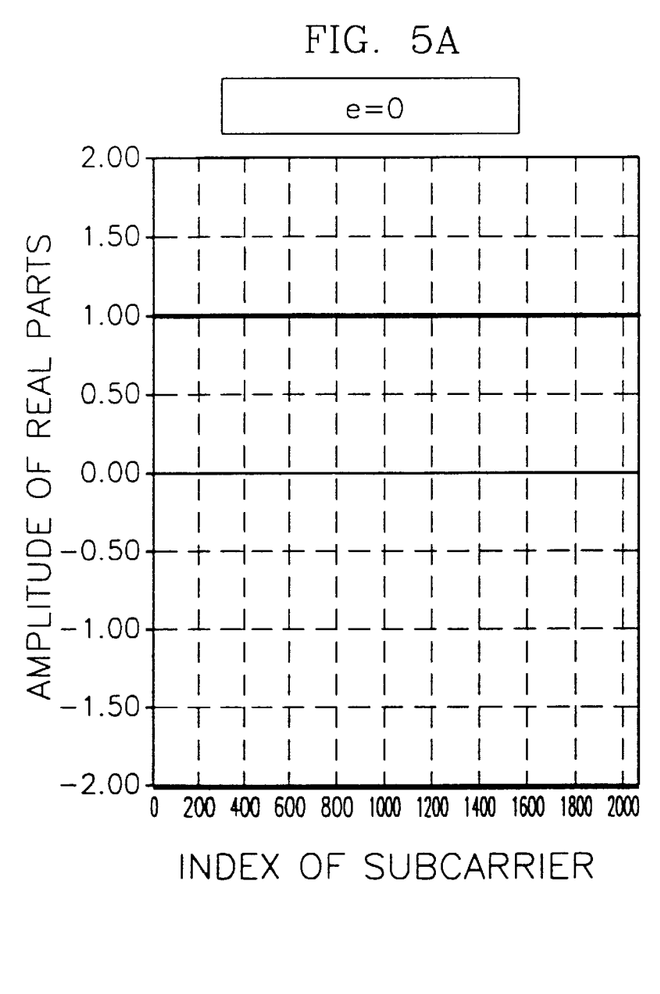
Figure 5B:
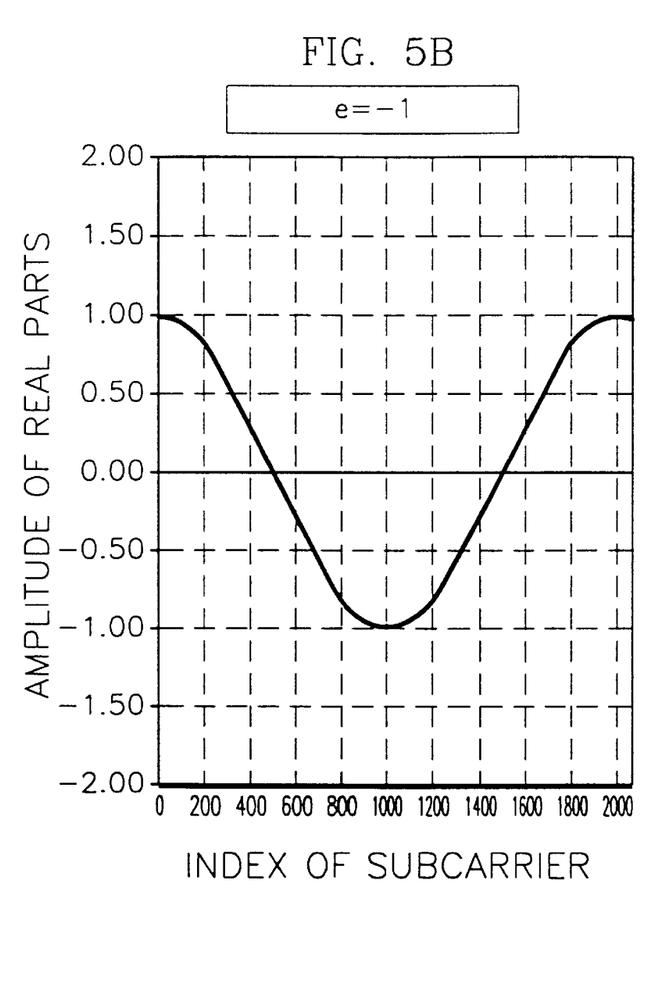
Figure 5C:
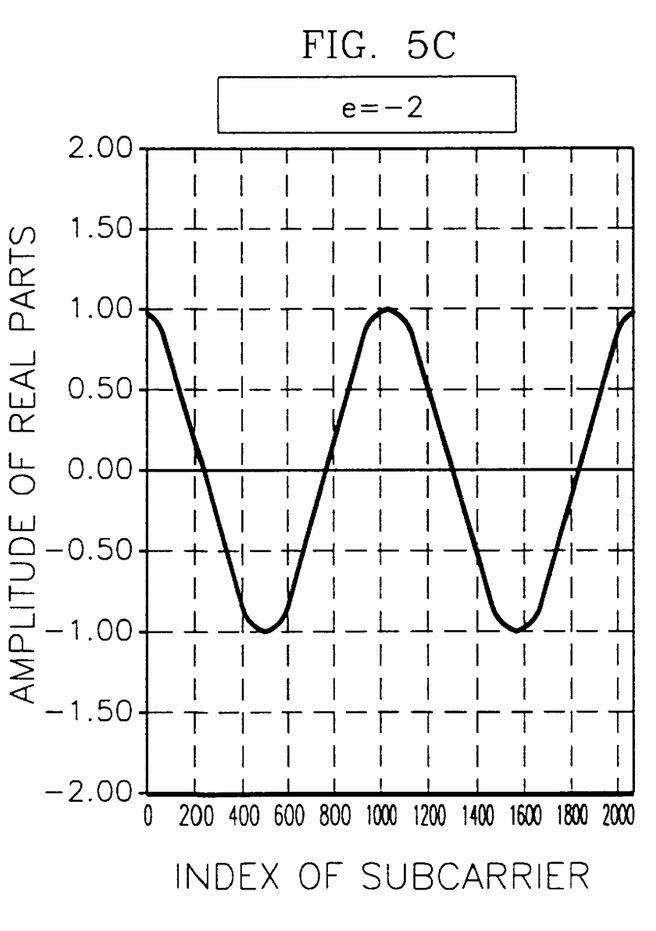
Figure 5D:
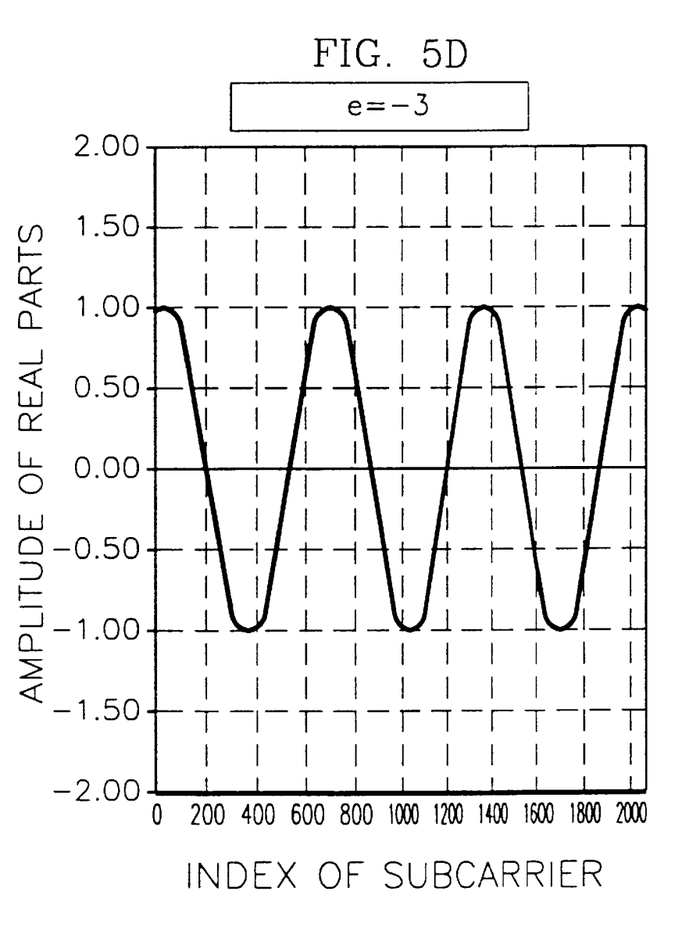

FIGS. 5a through 5d are graphs showing the changes in the real part of the FFT output value based on the window position error (e=0, −1, −2, and −3) of FIG. 3. When the subcarrier index numbers 0 through 2047 are sequentially detected, the amplitude does not change, as shown in FIG. 5A, because a sample position error does not exist when a (1,0) value is transmitted by the transmitter. FIGS. 5b through 5d are graphs showing the real part of the amplitude which changes because an error (e=1, −2, and −3) in a sample is generated. The x-axes represent the index of a subcarrier and the y-axes represent the magnitude of the real part in FIGS. 5a through 5d.

Figure 6A:
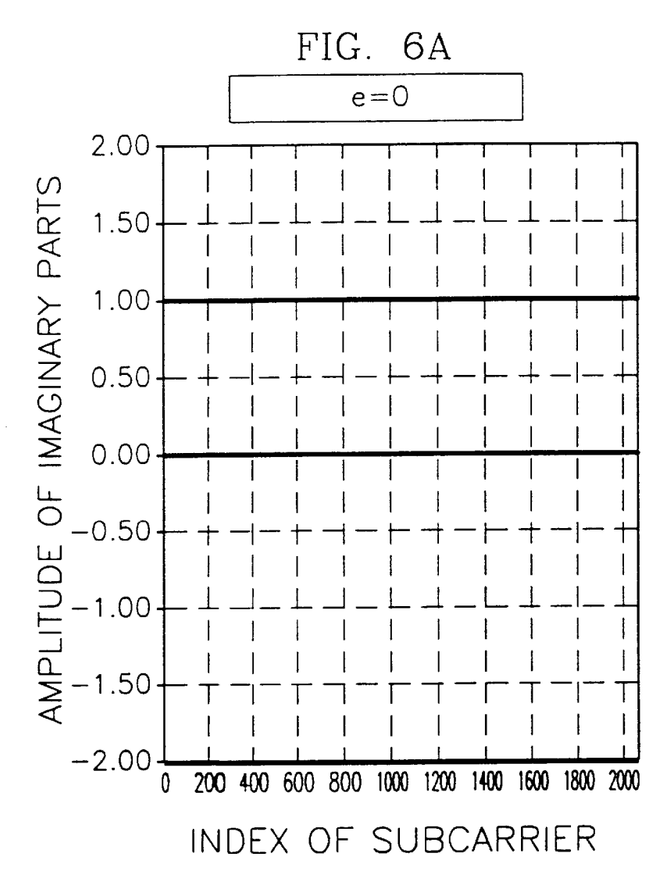
Figure 6B:
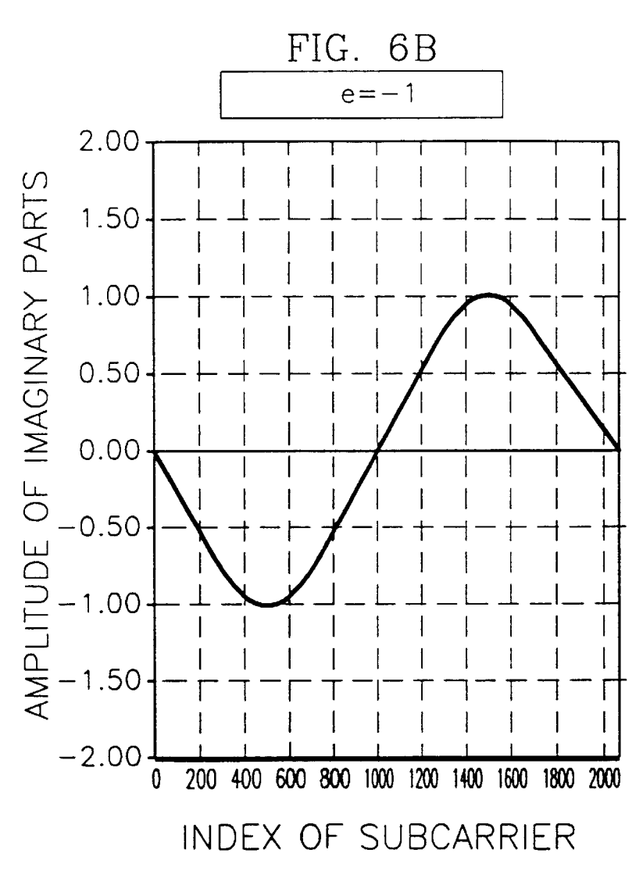
Figure 6C:
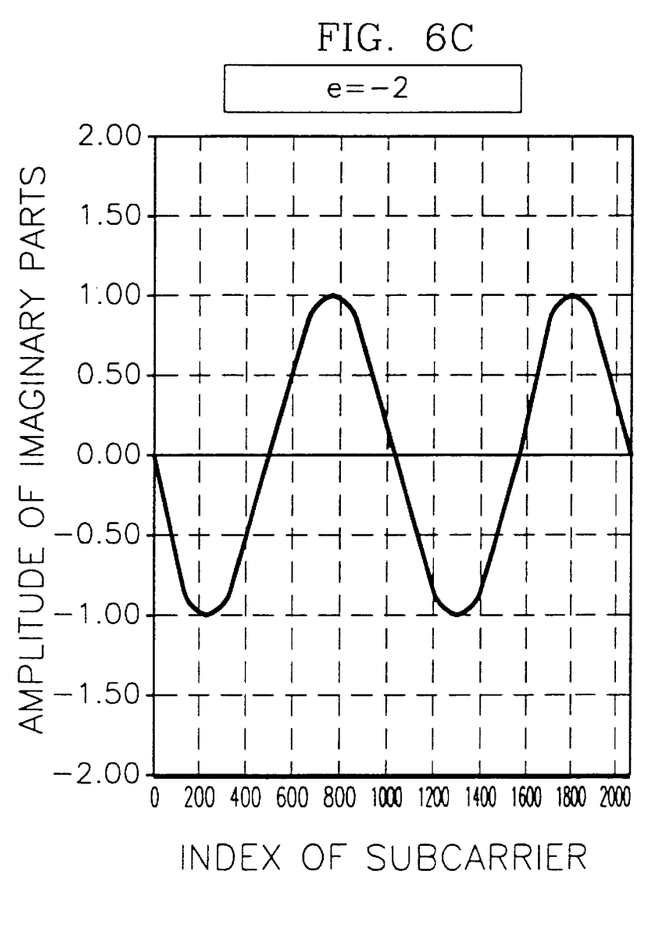
Figure 6D:
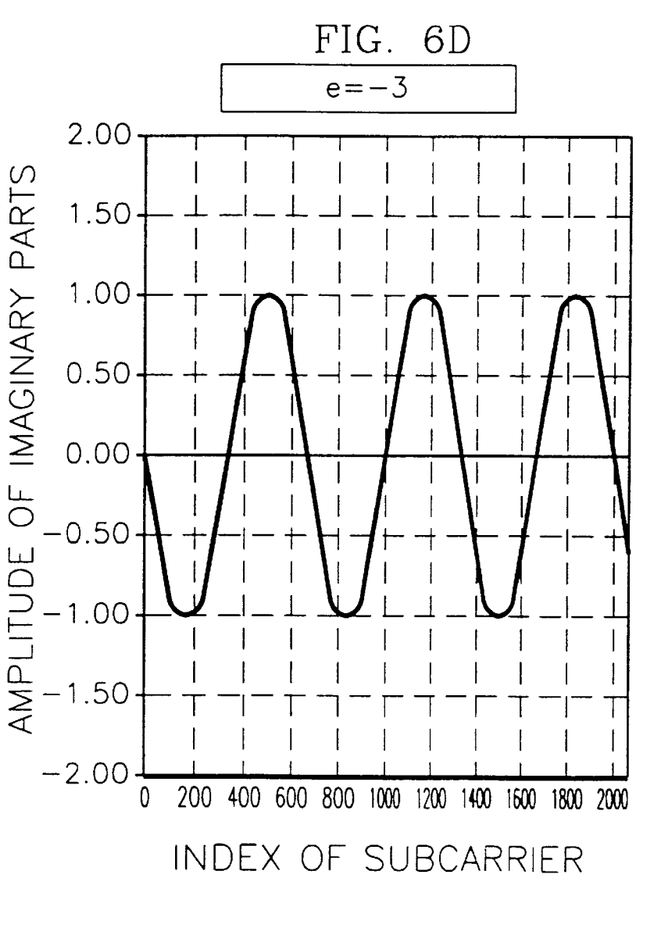

FIGS. 6a through 6d are graphs showing the changes in the imaginary part of the FFT output value based on the window position error of FIG. 3. When the subcarrier index numbers 0 through 2047 are sequentially detected, the amplitude does not change, as shown in FIG. 6A, because a sample position error does not exist when a (1,0) value is transmitted by the transmitter. FIGS. 6b through 6d are sample graphs showing an imaginary part of the amplitude which changes because a position error in a sample is generated. The x-axes represent the index of a subcarrier and the y-axes represent the magnitude of an imaginary part.

The operation and effect of the present invention will be described as follows. As shown in FIG. 2, the received OFDM signal is converted into complex samples by ADC 220 and is sequentially input to FFT 250. Symbol start detector 230 detects the start of a symbol by using the samples output from ADC 220 and outputs a symbol start signal to FFT window controller 240. FFT 250 demodulates the signal of each subcarrier modulated by the IFFT of a transmitting port to fast Fourier transform the samples of a second term sequentially input after removing the first term of the right-hand side of Equation 1 based on the symbol start signal generated by symbol start detector 230. Phase calculator 260 calculates the phase variation between the complex signal value known to the transmitter and receiver, with respect to a specific subcarrier, and the complex signal value output by FFT 250, after being received through the specific subcarrier in every subcarrier index. The known complex signal value is stored in a specific storage means (not shown) such as a ROM. If an error is generated in the symbol start detection of symbol start detector 230, a phase variation is generated in each subcarrier, thus deteriorating receiver performance. At this time, the magnitude of the phase variation differs according to the subcarrier index.

[Equation 2]

$$\phi_{MAX} = e \cdot 2\pi$$

[Equation 3]

$$\phi_k = \frac{e \cdot 2\pi \cdot k}{N}, \quad k = 0, 1, \ldots, N-1$$

Equations 2 and 3 represent the magnitude of the maximum phase variation based on the error of a symbol start detection and the magnitude of a phase variation generated in each subcarrier. Here, e represents the magnitude of an FFT symbol position recovery error, a unit is a sample, and k represents the subcarrier index. It is noted from Equations 2 and 3 that the maximum phase variation is generated in the complex signal value of the subcarrier having the maximum frequency. This is because the degree of a phase variation is smaller with respect to the same symbol position recovery error, as the subcarrier index is lower (a frequency is lower), and the degree of the phase variation becomes larger as the frequency becomes higher.

FIGS. 4a through 4d show the phase variation according to the FFT symbol position recovery error when a transmitter transmits the same complex value using every subcarrier. The phase variation of the complex value corresponding to each subcarrier is shown in Equation 4.

[Equation 4]

$$\hat{\phi}_k = \tan^{-1}\{Im(Y_k \cdot X_k^*)/Re(Y_k \cdot X_k^*)\}$$

In Equation 4, k, X, Y, $Re(Y_k \cdot X_k^*)$ and $Im(Y_k \cdot X_k^*)$, and * denote a subcarrier number, a complex value known to the transmitter and receiver, a received complex value, the real part and the imaginary parts of the complex value, and the conjugate value of the complex value, respectively.

The shape of an estimated phase variation $\hat{\phi}_k$ based on the FFT window position recovery error can be characterized by the number of zero-crossings $\hat{\phi}_k$. Zero-crossing counter 270 counts the number of zero-crossings of the variations calculated by phase calculator 260 by detecting changes in the sign. The number of zero-crossings is represented by Equation 5.

[Equation 5]

$$a = 2e - 1$$

wherein, a and e denote the number of zero-crossings and a sample error, respectively. For example, when a transmitter transmits a known complex value between a transmitter and receiver and a receiver performs a fast Fourier transform in FFT 250 without a window recovery error, a phase difference is not generated in FIG. 4a because a phase variation is not generated between the received and known data. However, different phase variations are generated from index 0 to index 2047(0, ... ,N-1) of the subcarrier between the received data and the known data, as shown in FIG. 4b, when one sample error (e=-1) is generated. The degree of the phase variation increases as the subcarrier index becomes larger. The maximum phase variation, whose magnitude is 360 degrees ($2\pi$ radian), is generated in the maximum index 2047(N-1) (360 degrees is shown as 0 degrees because the $\tan^{-1}$ function is used in Equation 4 in FIG. 4b).

When two sample errors (e=-2) are generated, the zero-crossing is generated (2e-1) times the sample error (e), as shown in Equation 5, because the maximum phase variation generated in index N has a magnitude of 720 degrees, which is twice 360 degrees. The FFT window position recovery error can be estimated in a sample unit by sequentially detecting the number (a) of zero-crossings of the complex symbol of the subcarrier in zero-crossing counter 270. Namely, the sample error (e) becomes (a+1)/2, as shown in Equation 5. FFT window controller 240 designates a position in which the FFT is activated based on the start of a symbol detected by symbol start detector 230, corrects the start of a symbol by calculating the error (e) of a sample unit of the remaining FFT from the number of zero-crossings generated by zero-crossing counter 270, and changes the position in which the FFT is activated by the corrected start of a symbol. Also, FFT window controller 240 must determine an error sign after estimating the magnitude of the FFT window position error. Namely, it must be determined whether the FFT window position of a receiver precedes or follows a correct FFT window point of time.

For example, FIG. 4b shows phase variations generated in the respective subcarriers when the FFT window error is -1. When the FFT window error is +1 sample, the phase variation generated in the respective subcarriers is symmetrical with respect to an X axis whose variation is 0, as shown in FIG. 4b. Therefore, a sign can be determined by detecting the change of the sign from positive (+) to negative (-), or from negative (-) to positive (+), at the position in which zero-crossing is performed from index 0 of the subcarrier.

However, when a phase offset, which is a phase difference between the RF subcarriers of a transmitter and a receiver, exists in an initial stage of a system, the zero-crossing position moves horizontally because the phase offset is added to the phase variation with respect to the FFT window position error. At this time, if the amount of movement is large, a method for determining the sign of the FFT window position error cannot be used anymore. The following method can be used in order to address this situation. Even if the FFT window error exists, as shown in FIGS. 4b, 4c, and 4d, there is little phase variation in the subcarrier indexes 0 and (N-1). Therefore, the FFT window controller 240 can remove the influence of the phase offset by subtracting the phase variation values of number 0 from the phase variation values of the subcarrier indexes from 0 to (N-1) obtained from phase calculator 260, thus correctly determining the sign of the FFT window position error using the change of the sign in the position in which the zero-crossing is performed.

Also, it is possible to improve transfer efficiency and reduce the load of phase calculator 260 by using some specific subcarriers, instead of all the subcarriers for estimating errors. However, the range in which errors can be estimated is inversely proportional to the distance between the selected subcarriers. Because a vibration of a small range is generated in the position in which the zero-crossing is generated, due to the vibration of the complex value caused by the phase error of the sampling clock of the receiver ADC and the influence of noise caused by additive white Gaussian noise surroundings, undesired zero-crossing can be generated. It is possible to estimate the number of zero-crossings by counting the number of changes in the sign using the change of signs of maximum and minimum values of an amplitude.

In FIG. 3, the change in the amplitude of the real or imaginary part of the received complex value output from the FFT 360 is calculated by zero-crossing counter 370. Zero-crossing counter 370 counts the number of zero-crossings by selecting the amplitudes of the real or imaginary part through the change in the amplitude of the real or imaginary part of the complex signal value output by FFT 360. The relationship shown in Equation 6 is established in the number of zero-crossings of the estimated phase variation values obtained by calculating the complex value output by FFT 360. The change in the amplitudes of the real and imaginary parts are shown in FIGS. 5b, 5c, 5d, 6b, 6c, and 6d.

[Equation 6]

$$\gamma = 2e = a+1$$

[Equation 7]

$$i = 2e-1 = a$$

In Equations 6 and 7, $\gamma$ and $i$ represent the number of zero-crossings of the real and imaginary parts of the received complex value output from FFT 360.

It is possible to lower the complexity of a system using the number of zero-crossings of the received value output by FFT 360 without detecting the number of zero-crossings by the estimated phase variation value obtained by calculating the phase variation between the transmitted and received complex values. FFT window controller 350 designates the position in which the FFT is activated based on the symbol starting portion detected by symbol start detector 340, calculates the remaining FFT position error (e) of a sample unit using Equations 6 and 7 with the number of zero-crossings generated by zero-crossing counter 370, controls the sample position in which the error is generated, and performs a fine position recovery error.

According to the present invention, it is possible to guarantee the reliability of a system by correcting the phase error of the FFT window using the number of zero-crossings of the phase variation calculated between the transmitted and received complex values and the number of zero-crossings of the amplitude of the real or imaginary part of the received complex value, even if the FFT window position recovery error is generated.

What is claimed is:

1. A fine FFT window position recovering apparatus of an OFDM receiver for recovering a fast Fourier transform (FFT) window position using a symbol, including N effective data samples and G guards intervals, comprising:

an analog-to-digital converter for converting an OFDM signal into a digital complex sample;

a symbol start detector for detecting a starting portion of the symbol from digital complex samples output from the analog-digital converter;

an FFT means for fast Fourier transforming the digital complex samples generated by the analog-to-digital converter based on the symbol start portion detected by the symbol start detector;

a phase calculator for calculating phase variations between a complex value output from the FFT means and a known transmitted complex value;

a zero-crossing counter for counting the number of zero-crossings of the phase variations generated by the phase calculator; and an FFT window controller for activating the FFT of the FFT means based on the symbol starting portion detected by the symbol start detector and for compensating for the sample error of the FFT of the FFT means by detecting the remaining FFT position error of a sample unit from the number of zero-crossings generated by the zero-crossing counter.

2. The fine FFT window position recovering apparatus as claimed in claim 1, wherein the phase variation of the phase calculator is calculated by $\tan^{-1}\{\text{Im}(Y_k \cdot X_k^*)/\text{Re}(Y_k \cdot X_k^*)\}$, wherein K, X, Y, $\text{Re}(Y_k \cdot X_k^*)$ and $\text{Im}(Y_k \cdot X_k^*)$, and * denote the number of a subcarrier, a transmitted complex value which is known to the transmitter and the receiver, a received complex value, the real part and the imaginary part of the complex value, and the conjugate of the complex value, respectively.

3. The fine FFT window position recovering apparatus as claimed in claim 1, wherein the zero-crossing counter counts the zero crossing points of the phase variation sequentially detected through the numbers 1 through N of the subcarrier.

4. The fine FFT window position recovering apparatus as claimed in claim 1, wherein the sample error (e) of the FFT window controller is (a+1)/2, wherein a is the number of zero-crossings.

5. The fine FFT window position recovering apparatus as claimed in claim 1, wherein the FFT window controller determines an FFT window position error sign using the change in the sign in the position in which the zero-crossing is performed.

6. The fine FFT window position recovering apparatus as claimed in claim 5, wherein the FFT window position error sign is determined by subtracting the phase variation values of the number 0 of the subcarrier from the phase variation values of all numbers of the subcarrier.

7. A fine FFT window position recovering apparatus of an OFDM receiver for recovering an FFT window position using a symbol, including N effective data samples and G guard intervals as a unit, comprising:

an analog-to-digital converter for converting an OFDM signal into a digital complex sample;

a symbol start detector for detecting a starting portion of the symbol from digital complex samples output from the analog-to-digital converter;

an FFT means for fast Fourier transforming the complex digital sample generated from the analog-digital converter based on the symbol start portion detected by the symbol start detector;

a zero-crossing counter for counting the number of zero-crossings of the complex signal amplitude output from the FFT means; and an FFT window controller for activating the FFT of the FFT means based on the symbol starting portion detected by the symbol start detector and for compensating for the sample error of the FFT of the FFT means by detecting the remaining FFT position error of a sample unit from the number of zero-crossings generated by the zero-crossing counter.

8. The fine FFT window position recovering apparatus as claimed in claim 7, wherein the number of the zero-crossings of the zero-crossing counter is obtained by counting the zero-crossings by selecting the real part or the imaginary part of the complex value output from the FFT means.

9. The fine FFT window position recovering apparatus as claimed in claim 7, wherein the sample error (e) of the FFT window controller is $(r+1)/2$ when the real part is selected, wherein r is the number of zero-crossings of the amplitude of the real part.

10. The fine FFT window position recovering apparatus as claimed in claim 7, wherein the sample error (e) of the FFT window controller is $(i+1)/2$ when the imaginary part is selected, wherein i is the number of zero-crossings of the amplitude of the imaginary part.

* * * * *